United States Patent
Brenner

[19]

[11] Patent Number: 6,158,627

[45] Date of Patent: Dec. 12, 2000

[54] DEVICE FOR FEEDING LIQUID-CONTAINING MATERIAL TO A SEPARATOR

[76] Inventor: Horst Brenner, Steinbeisstrasse 2, 71717 Beilstein, Germany

[21] Appl. No.: 09/231,443

[22] Filed: Jan. 14, 1999

[30] Foreign Application Priority Data

Jan. 14, 1998 [DE] Germany .............................. 198 01 070

[51] Int. Cl.$^7$ .................................................. B65G 33/00

[52] U.S. Cl. ...................... 222/240; 222/413; 198/550.1; 198/550.7

[58] Field of Search .................................... 222/227, 236, 222/235, 239, 240, 412, 413; 148/550.1, 550.7, 671

[56] References Cited

U.S. PATENT DOCUMENTS 2,484,070 10/1949 Boyce ...................................... 198/568
3,225,968 12/1965 Winkler et al. .......................... 222/238
3,433,598 3/1969 Faaborg-Andersen et al. ........ 422/268
3,836,337 9/1974 Bruniche-Olsen ...................... 422/273
4,852,719 10/1949 Lapeyre .................................. 198/666

*Primary Examiner*—Charles R. Eloshway
*Assistant Examiner*—Peter deVore
*Attorney, Agent, or Firm*—Ostrolenk, Faber, Gerb & Soffen, LLP

[57] ABSTRACT

A device feeds curable, liquid containing material, especially residual concrete, residual mortar and the like, to a separator for separating the material into defined individual components. The feeding device includes a receiving trough for the material, in which a conveying screw is rotatably arranged. Through its rotation, the screw conveys the material to the separator. There is a barrier between the receiving trough and the separator which prevents liquid exchange, and that barrier is bridged by a transfer device which enables metered conveyance of the material through the barrier.

18 Claims, 1 Drawing Sheet

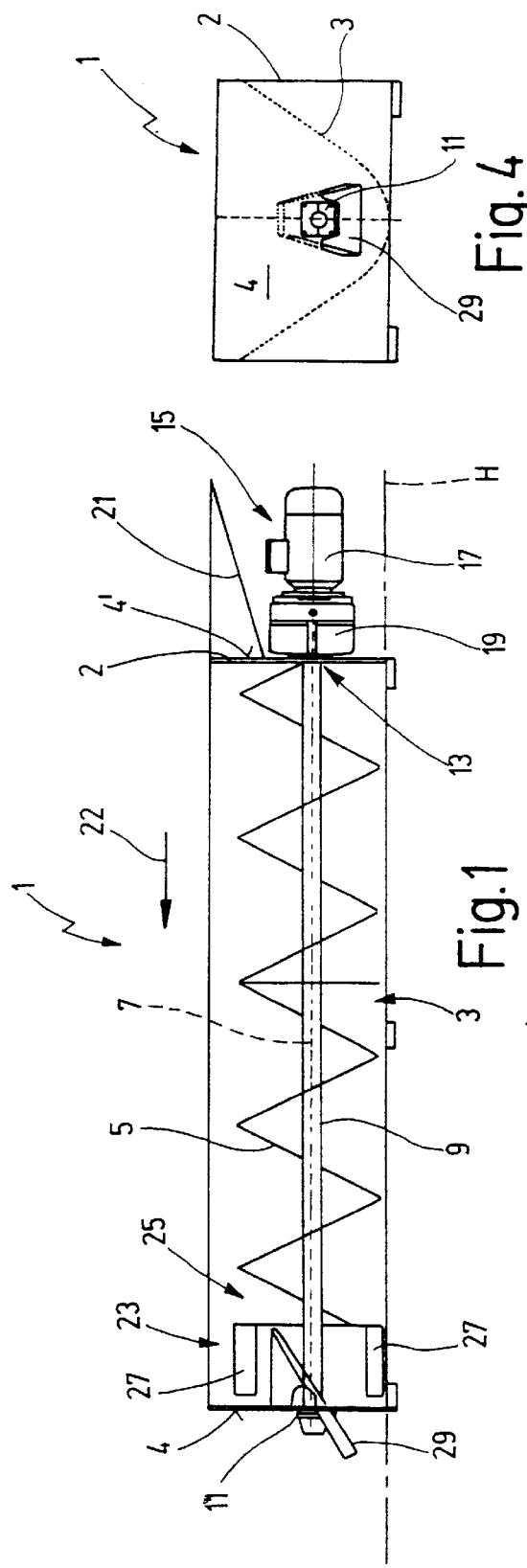
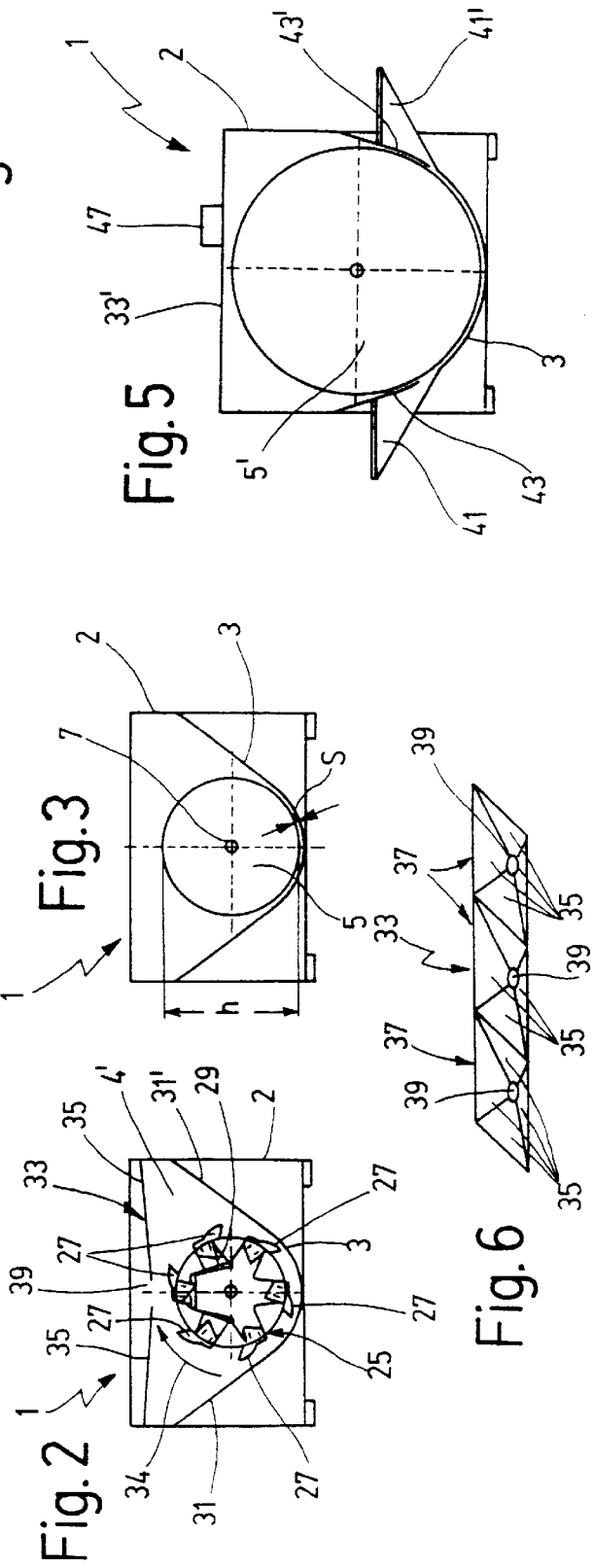

DEVICE FOR FEEDING LIQUID-CONTAINING MATERIAL TO A SEPARATOR

BACKGROUND OF THE INVENTION

The invention relates to a device for feeding curable, liquid containing material, especially residual concrete, residual mortar, and the like, into, through and out of the feeding device and thereafter to a separator for separating the material into defined individual components.

Devices of this type are employed, for example, in ready-mix concrete works and are used to take up unset residues of curable material, such as concrete, mortar and the like, and convey them to a separator for separating the material into defined components. The material in the drum of a truck mixer, for which no further use can be found, is emptied into the feeding device. In this procedure the drum of the truck mixer is usually cleaned internally with up to 2 m$^3$ of water in order to prevent caking of the residual material on the inside of the drum.

WO 94/00634 discloses a feeding device of this type, which comprises a receiving trough for the material, in which a conveying screw is rotatably disposed. The feeding device communicates, via a passage in the lower region of the end wall of the receiving trough, with a separator which is filled with water in its lower region. Starting from an appropriate level of filling, the washing water is able to flow unhindered back and forth through this passage between the separator and the feeding device. Rotation of the conveying screw conveys the residual material from the feeding device into the separator. If too large an amount of residual material and washing water are introduced into the feeding device too rapidly, the displacement results in excessive flow rates of the washing water within the separator as well, thereby entraining a large quantity of fines from the separator into a stir tank from which the washing water is withdrawn in order to produce fresh concrete. This may breach the water density limit, owing to the entrained fines, so that the washing water in the stirred tank can no longer be used for concrete production. The 30 to 50 m$^3$ of washwater in the stirred tank then have to be disposed of, which entails high costs. In addition, fines settle on the floor of the stirred tank, despite use of a stirring apparatus. If the height of the sludge layer reaches a certain level, the stirred tank must be emptied, and the solid deposits have to be removed using a compressed-air hammer and then likewise disposed of.

It has been further found that when very liquid residual material, such as concrete, is introduced, it behaves like water. Owing to the design of the known feeding device, the residual material flows uncontrolled into the separator independently of the rotary speed of the conveying screw, and it may overload the separator. Upon an overload which leads to deterioration in the separation efficiency, the separator switches off and the material (residual concrete, residual mortar) has to be removed manually from the separator. In addition, an overload may damage the separator. Since emptying the truck mixer generally takes place at the end of a working day and since ready-mixed concrete plants, or at least fairly large ones, have a number of truck mixers, this often produces considerable waiting times at the feeding device and the separator, which is not only associated with high costs owing to the overtime of the drivers and the operators but also results in the residual material and the washwater frequently being too rapidly emptied into the feeding device, and so inducing the above-mentioned disadvantages.

A further disadvantage associated with the known feeding device is that the base of the receiving trough must be disposed at the same depth as, or deeper than, the exit of the separator for the washwater, and the exit is connected to the stirred tank. As a result, constructional measures, for example, a concrete pit, are necessary for the depth construction of the separator.

SUMMARY OF THE INVENTION

It is therefore the object of the invention to provide a feeding device with which the above disadvantages are avoided.

In order to achieve this object, a feeding device for curable material has a longitudinally extending trough and a material conveying screw with a rotation axis extending along the axis of the trough. In this device, a barrier is disposed between the receiving trough and the separator, which prevents liquid exchange and which is bridged by a transfer device which undertakes metered conveyance of both the material and its liquid. This design permits the residual material and the liquid, water for example, to be stored in the feeding device and, with the aid of the transfer device, to be supplied to the separator in a desired volume per unit time. The barrier, therefore, prevents uncontrolled flow of the liquid and/or of the residual material from the feeding device into the separator, so that overloading of the separator can be virtually ruled out. Through the interim storage of both the residual material and the liquid, and the controlled supply of the material to the separator, it is also possible to ensure a noncritical proportion of fines in the liquid flowing off from the separator into a stirred tank, and/or liquid introduced into the tank in other ways.

An embodiment of the feeding device is preferred in which the transfer device comprises at least one bucket conveyor having at least one bucket. The quantity of closed buckets is preferably variable, so that the amount of material and liquid supplied to the separator can be adjusted independently of the rotary speed of the bucket conveyer. The extractive washing of the separator and the proportion of fines, sand, for example, in the liquid discharged from the separator can be used to produce fresh material such as concrete or mortar, for example. Its quality can also advantageously be influenced in a controlled manner via the quantity of scoop buckets and their volume and by the rotary speed of the bucket conveyer. The limit of the specific weight of the liquid which is used to produce fresh concrete is for example 1.07 g/dm$^3$. In the case of mortar, the limit may be only 1.05 g/dm$^3$.

In a development of the invention, the transfer device has an exit chute which is arranged below the discharge point of the bucket conveyor and is preferably directed obliquely downward. The incline of the exit chute is preferably chosen so that the residual material passes automatically into the separator. The distance between the feeding device and the separator can be varied by adjusting the length of the exit chute. It has been found advantageous to configure the exit chute to be as short as possible.

Finally, an embodiment of the feeding device is preferred in which the receiving trough can be covered by a cover, and the interior of the receiving trough, especially the air space below the cover, can be heated with a heating apparatus. This makes it possible to prevent freezing of the liquid in the receiving trough, so that the feeding device is able to operate even at low temperatures.

Other features and advantages of the present invention will become apparent from the following description of the invention which refers to the accompanying drawings.

BRIEF DESCRIPTION OF THE DRAWINGS

FIG. 1 shows a longitudinal section through a first embodiment of a feeding device;

FIG. 2 shows a cross-section through the feeding device of FIG. 1 in the axial region of a bucket conveyor;

FIG. 3 shows a further cross-section through the feeding device depicted in FIG. 1;

FIG. 4 shows a front elevation of the end face of the feeding device depicted in FIG. 1, which end face faces a separator in the assembled state of the feeding device;

FIG. 5 shows a cross-section through a further embodiment of the feeding device, and FIG. 6 shows a perspective view of an embodiment of a cover for a receiving trough of a feeding device.

DETAILED DESCRIPTION OF THE INVENTION

The feeding device described below can be employed in general for applying curable, liquid containing material to a separator, also referred to as an extractive washing machine, for separating the material into defined individual components. The material is, for example, concrete, mortar and the like, which has not yet set.

FIG. 1 shows a schematic longitudinal section through an embodiment of a feeding device 1 which comprises a receiving trough 3, mounted on a frame 2, for curable but as yet unset material, such as concrete or mortar, and a liquid such as water, which originate, for example, from the emptying and cleaning of a truck mixer drum. The channel-like receiving trough 3 is closed at its end faces by end walls 4 and 4', respectively, for preventing outflow of liquid and material from the receiving trough 3, which is disposed parallel to an imaginary horizontal H. A conveying screw 5 is disposed in the conveying trough 3. The screw is of circular based cylindrical design. The screw is connected to a drive shaft 9 which is rotatable about its lengthwise center axis 7. The conveying screw 5 has turns that are arranged at a distance from the receiving trough, so that the liquid in the receiving trough is able to flow back and forth with a greater or lesser extent of freedom. The drive shaft 9 is mounted at both its ends on the frame 2, by two bearings 11 and 13 disposed outside the receiving trough 3, so that contact with the material and the corrosive liquid is prevented. The drive shaft 9 can be rotated by a drive apparatus 15, which in this embodiment comprises an electric motor 17 and a gear mechanism 19. A feed hopper 21 in the region of the end wall 4' closes the end face of the receiving trough 3 and the material and the washwater can be emptied into the hopper. From the feed hopper 21, the material and the washwater pass into the receiving trough 3. Rotation of the conveying screw 5 conveys the material, from right to left in this embodiment, in the direction of arrow 22, to the other end of the receiving trough 3 and to a transfer device 23. The transfer device 23 has the purpose of bridging the barrier formed by the side wall 4 and metering supply of the liquid and the material in the receiving trough 3 to the separator (not shown).

The transfer device 23 comprises a bucket conveyor 25 having a plurality of closed buckets 27 of which only two buckets can be seen in FIG. 1. The bucket conveyor 25 is connected and fixed for rotation to the drive shaft 9, so that when the drive shaft 9 rotates, the conveying screw 5 conveys the material in the direction of the arrow 22 and at the same time, the bucket conveyor 25 in the discharge region, i.e., in the region of the barrier between the receiving trough and the separator also rotates. The barrier in this embodiment is formed by the end wall 4. The material and the liquid are discharged from the receiving trough 3 by the bucket conveyor 25. There is an exit chute 29 below the discharge point of the bucket conveyor 25. The chute 29 is directed obliquely downward. The material and the liquid are discharged to the chute, and from there they pass, preferably automatically, to a receiving region of the separator (not shown).

FIG. 2 shows a cross-section through the feeding device 1. Identical parts are given identical reference numerals as referenced in the description of FIG. 1. It is evident that the channel-like receiving trough 3 is semicircular in the region of its base. The semicircular section merges steplessly into two straight side-wall sections 31 and 31' which diverge obliquely vertically.

In this embodiment, the receiving trough 3 is covered by a preferably removable cover 33 which is spaced at a distance from and above the bucket conveyor 25 and the conveying screw 5. The cover 33 is preferably of sheet metal. It is described with reference to FIG. 6, which shows a perspective view of one exemplary embodiment of the cover 33. The cover 33 extends preferably over the entire length of the receiving trough 33. The cover has a plurality of triangular surfaces 35 which extend obliquely inward toward the floor of the receiving trough. Sets of four of the surfaces 35 are inclined and aligned with respect to one another to form a hopper 37. In FIG. 6, the cover 33 has three hoppers 37. It is possible for the cover 33 to have only one or two hoppers 37, or more than three hoppers, like four hoppers, for example. A passage 39 is provided in the base of each hopper 37 through which liquid and material emptied onto the cover 33 falls into the receiving trough 3.

FIG. 2 shows that the bucket conveyor 25 has a total of six buckets 27 of equal size which are distributed evenly around an imaginary circle. The buckets 27, which can be used to scoop material and liquid, are preferably detachably mounted on the bucket conveyor 25, so that the number of buckets 27 of the bucket conveyor 25 can be varied depending on the operating situation. This enables adjusting the amount of material and liquid supplied to the separator. The direction of rotation of the drive shaft 9 for discharging the material and the liquid from the receiving trough is indicated with an arrow 34. As seen in FIG. 2, the buckets extend essentially to the bottom of the trough and the trough is correspondingly shaped so that the buckets extend essentially to the bottom of the trough. FIG. 2 also shows the part of the exit chute 29 that is disposed in the receiving trough 3. The base of the chute is trapezoidal in design.

FIG. 3 shows a further cross-section through the feeding device 1. The height h of the cylindrical conveying screw 5 is smaller than the maximum filling level of the receiving trough 3. The turns of the conveying screw 5 are spaced at a distance from the floor of the semicircular receiving trough 3. The form of the turns of the conveying screw and the radius of the semicircular floor region of the receiving trough are adapted to each other such that a gap of constant height is formed between the floor of the receiving trough and the periphery of the conveying screw—that is, the turns. The gap height s lies within a range from 10 to 50 mm and is preferably around 30 mm.

FIG. 4 shows a front elevation of the end wall 4 of the feeding device 1. The end wall 4 is a barrier between the receiving trough 3 and a separator (not shown). The wall 4 has an aperture for the exit chute 29, so that inside the receiving trough the material and the liquid discharged onto the exit chute are able to slide and flow down, respectively, into the separator. Furthermore, one bearing 11 is disposed outside the receiving trough 3, and the aperture for the exit chute is located below the bearing 11. By arrangement of the aperture, the maximum filling level of the liquid in the receiving trough can thus be defined.

FIG. 5 shows a schematic cross section through a further embodiment of the feeding device 1. Parts which correspond with those in the preceding Figures have the same reference numerals and are described by reference to the preceding Figures. The height, i.e. the diameter, of the cylindrical conveying screw 5' is in this case both greater than the maximum filling level of the receiving trough and greater than the maximum fill height of the truck mixers from whose drums the residual material and the liquid are emptied into the receiving trough. That fill height can, for example, be 1.5 m maximum. Alternatively or in addition to the feed hopper 21 in FIG. 1, in FIG. 5 there are two feed hoppers 41 and 41' that are disposed laterally on the receiving trough 3 via which is possible to empty the material and the liquid from the truck mixer drums into the hoppers. A protection element, is arranged in each of the feed hoppers 41, 41', respectively, which is formed by a metal splash plate 43 or 43', respectively, and which serves to prevent material and liquid from splashing or flowing out the respective feed hopper. The protection elements 43, 43' also ensure that it is impossible to reach from outside into the conveying screw 5' so as to reduce the risk of injury.

In FIG. 5, the receiving trough 3 is closed off at its end faces and is covered by a preferably removable cover 33'. A heating apparatus 47 comprised, for example, of an air-circulation heating unit is mounted, for example, on the cover 33'. With the aid of the heating apparatus 47, the interior of the receiving trough 3, especially the air space below the cover 33', can be heated, so that reliable operation of the feeding device 1 can be ensured even at low temperatures.

A common feature of all embodiments is that the length of the receiving trough 3 can be extended through modular construction. The receiving trough is comprised of a base structure, and can be extended by attachment of one or more modules. Preferably, the conveying screw is also extendable.

Residual concrete, residual mortar and the like, and washwater can be introduced into the receiving trough 3 of the feeding device 1, even in a short period of time and in a large volume in the course, for example, of emptying truck mix drums, without the occurrence of excessive flows of water or of a nonuniform supply of material in the separator, (also referred to as an extractive washing machine) arranged downstream of the feeding device 1. The purpose of the separator is to separate the material into defined individual components. The only parameter to note when emptying the truck mixer drums is the maximum filling level of the feeding device, which in the embodiment of FIG. 5 is defined by the top edge of the feed hoppers 41, 41'. The liquid and the material introduced through the feed hopper 21, the passages 39 in the cover 33 and/or the feed hoppers 41, 41' into the receiving trough 3 are transported in the direction of the bucket conveyor by rotation of the conveying screw 5 and are lifted upward by the closed buckets 27. At the top apex of the bucket conveyor, the buckets empty the material and the washwater, thereby supplying them in a metered amount to the separator.

In summary, the feeding device 1 makes it possible to receive and store large amounts of material and wash water and to meter their supply to a separator which is downstream of the feeding device 1 and whose purpose is to separate the material into its components. This enables ensuring a desired separation efficiency and extractive washing performance of the separator. Furthermore, entrainment of fines from the separator into a stirred tank, located downstream of the separator, for the wash/residual water is prevented, at least to a very large extent. The residual water led off into the stirred tank can therefore be used to produce fresh concrete, mortar and the like, and can be supplied to a mixer. The method of operation of the feeding device reduces the waiting times of the drivers of the truck mixers for emptying the residual material from the truck mixer drum into the feeding device without thereby affecting the function of the separator. Separator overload, which can lead to long downtimes and to damage to parts of the separator, can practically be prevented. It has been found that a considerably lower water density can be realized in the stirred tank with the residual water from the separator using the present invention than with separators that are known in the prior art. The suspended particles in the liquid are preferably smaller than $3/10$ mm. With the aid of the bucket conveyor of the feeding device, the washwater and the material are lifted out of the receiving trough so they can flow into the separator at the height of its water level. This obviates the need for constructional measures such as, for example, a pit for the separator in order to produce the required height difference.

A further advantage of the feeding device 1 is that even separators which are already installed can be retrofitted.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for feeding a curable, liquid-containing material into, through and out of the device, the device comprising:

a trough having a longitudinal, axial direction of extension;

a conveying screw rotatably disposed in the trough and having a rotation axis extending axially of the trough, the conveying screw being shaped and the trough being shaped and positioned such that rotation of the screw around the rotation axis conveys the material downstream axially through the trough, the trough and the conveying screw having an upstream end and a downstream end with respect to the conveyance of material through the trough; the conveying screw being generally cylindrical and the screw having such a diameter and the axis of the screw being so placed that the height of the conveying screw in the trough is taller than the maximum filling level of material in the trough:

a barrier at the downstream end of the trough preventing exit of material from the trough; and a transfer device at the downstream end of the trough comprising an element which bridges and passes through the barrier for conveying the material through the barrier and out of the trough;

the transfer device further comprising a conveyor rotatably disposed in the trough and rotatable around the rotation axis of the conveyor screw; the conveyor being shaped for raising material from the bottom of the trough to an upraised position, and for there transferring the upraised material to the element.

2. The feeding device of claim 1, wherein the conveyor is a bucket conveyor in the trough with at least one bucket thereon, the bucket conveyor being rotatable to move the at least one bucket from below the axis to above the axis and in the trough; and the transfer device element being shaped and positioned for permitting exit of material from the trough and past the barrier when at least one bucket has raised the material to the element and the bucket has delivered material to the element for passage of the material through the barrier.

3. The device of claim 2, wherein the element comprises an exit chute; the bucket of the bucket conveyor having a discharge point along the path of the bucket conveyor and the exit chute is disposed below the discharge point of the bucket.

4. The feeding device of claim 3, wherein the exit chute is disposed obliquely downwardly in the direction through the barrier and out of the trough.

5. The feeding device of claim 3, wherein the trough is of modular construction and the length of the receiving trough can be extended due to the modular construction.

6. The feeding device of claim 2, wherein the trough has a floor beneath the screw conveyor and the floor is at least essentially parallel to the horizontal.

7. The feeding device of claim 2, further comprising a drive shaft having an axis extending along the trough, and the conveying screw and the bucket conveyor both being connected to the drive shaft to be rotated thereby.

8. The feeding device of claim 7, wherein the drive shaft is mounted for rotation in the trough and further comprising mountings of the drive shaft located outside the trough.

9. The feeding device of claim 2, wherein the conveyor screw has an outer periphery, the trough has a floor below the screw and the trough being shaped and the screw being sized and placed within the trough so that the periphery of the screw is spaced at a distance from the floor of the trough defining a gap between the floor of the trough and the periphery of the conveyor screw within a range of 10 to 50 mm.

10. The feeding device of claim 9, wherein the gap is about 30 mm.

11. The feeding device of claim 2, further comprising a feed hopper outside the trough for feeding material into the trough for being conveyed by the conveying screw.

12. The feeding device of claim 11, wherein the feed hopper is provided at the upstream end of the trough.

13. The feed hopper of claim 11, further comprising a protection element in the feed hopper for preventing material and liquid from being thrown out from the feed hopper and for preventing direct reaching by hand through the feed hopper to the conveying screw.

14. The feeding device of claim 2, further comprising a cover disposed over the receiving trough.

15. The feeding device of claim 2, wherein the at least one bucket is so positioned and the trough is so shaped that the bucket substantially pass by the bottom of the trough as the conveyor is rotated.

16. A device for feeding a curable, liquid-containing material into, through and out of the device, the device comprising:

a trough having a longitudinal axial direction of extension;

a conveying screw rotatably disposed in the trough and having a rotation axis extending axially of the trough, the conveying screw being shaped and the trough being shaped and positioned such that rotation of the screw around the rotation axis conveys the material downstream axially through the trough, the trough and the conveying screw having an upstream end and a downstream end with respect to the conveyance of material through the trough;

a barrier at the downstream end of the trough preventing exit of material from the trough; and a transfer device at the downstream end of the trough comprising an element which bridges and passes through the barrier for conveying the material through the barrier and out of the trough;

the transfer device further comprising a conveyor rotatably disposed in the trough and rotatable around the rotation axis of the conveyor screw; the conveyor being shaped for raising material from the bottom of the trough to an upraised position and for there transferring the upraised material to the element; the conveyor being a bucket conveyor in the trough with at least one bucket thereon, the bucket conveyor being rotatable to move the at least one bucket from below the axis to above the axis and in the trough; and the transfer device element being shaped and positioned for permitting exit of material from the trough and past the barrier when the at least one bucket has raised the material to the element and the bucket has delivered material to the element for passage of the material through the barrier;

a cover disposed over the trough and including a plurality of areas which extend obliquely inward toward the trough and forming at least one feed hopper for material in the cover; at least one passage in the base of the hopper formed in the cover for permitting entrance of material into the trough.

17. A device for feeding a curable, liquid-containing material into, through and out of the device, the device comprising:

a trough having a longitudinal, axial direction of extension;

a conveying screw rotatably disposed in the trough and having a rotation axis extending axially of the trough, the conveying screw being shaped and the trough being shaped and positioned such that rotation of the screw around the rotation axis conveys the material downstream axially through the trough, the trough and the conveying screw having an upstream end and a downstream end with respect to the conveyance of material through the trough;

a barrier at the downstream end of the trough preventing exit of material from the trough; and a transfer device at the downstream end of the trough comprising an element which bridges and passes through the barrier for conveying the material through the barrier and out of the trough;

the transfer device further comprising a conveyor rotatable disposed in the trough and rotatable around the rotation axis of the conveyor screw; the conveyor being shaped for raising material from the bottom of the trough to an upraised position, and for there transferring the upraised material to the element; the conveyor being a bucket conveyor in the trough with at least one bucket thereon, the bucket conveyor being rotatable to move the at least one bucket from below the axis to above the axis and in the trough; and the transfer device element comprising an exit chute shaped and positioned for permitting exit of material from the trough and past the barrier when the at least one bucket has raised the material to the element and the bucket has delivered material to the element for passage of the material through the barrier, and at least one bucket having a discharge point along the path of the bucket conveyor, and the exit chute being disposed below the discharge point of the bucket, a heater communicating into the trough for heating the interior of the trough at least in the air space below the cover.

18. The feeding device of claim 17, wherein the heater comprises an air circulation heating unit.

* * * * *